Patented Sept. 19, 1950

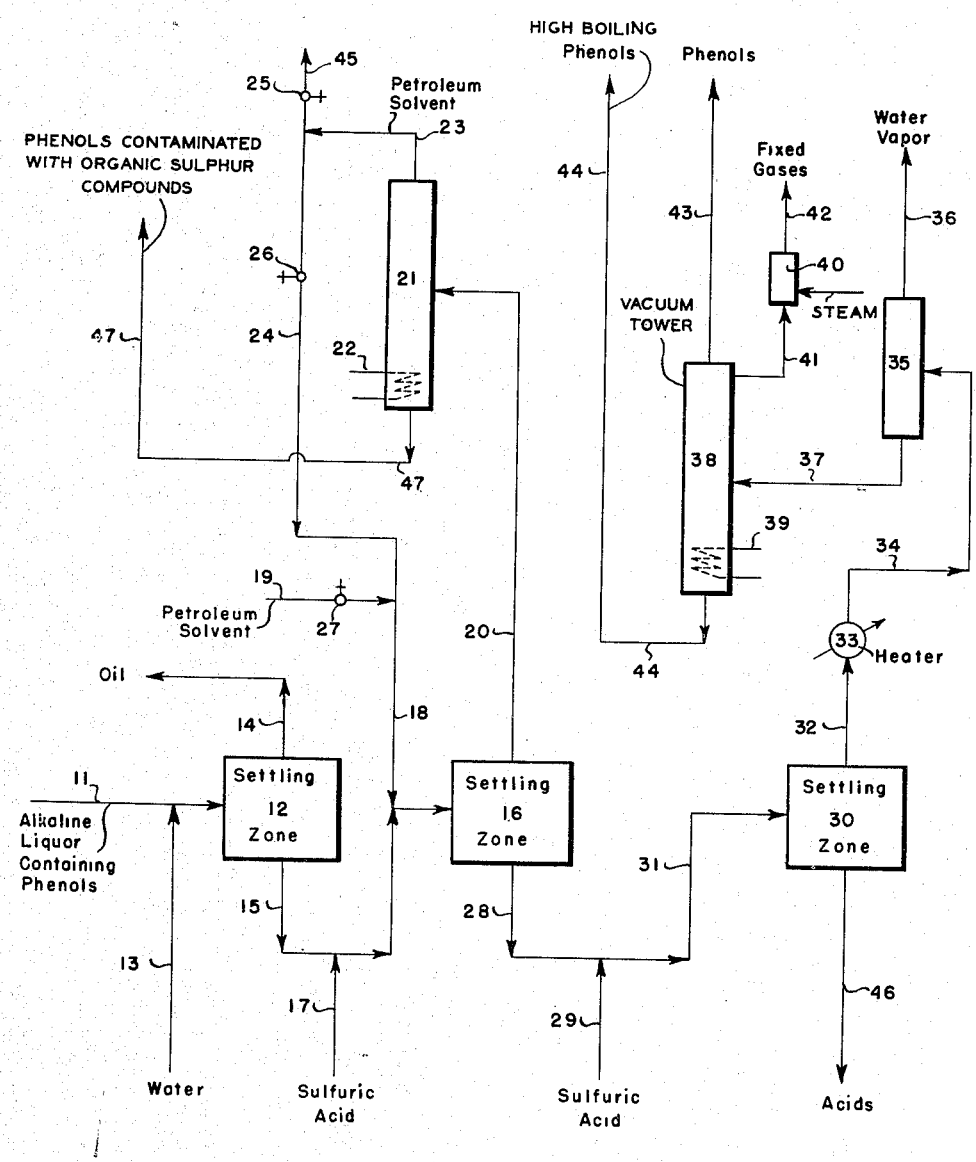

2,523,154

UNITED STATES PATENT OFFICE 2,523,154

PURIFICATION OF PETROLEUM PHENOLS

Albert J. Shmidl, Houston, Tex., assignor, by mesne assignments, to Standard Oil Development Company, Elizabeth, N. J., a corporation of Delaware Application September 27, 1947, Serial No. 776,534

4 Claims. (Cl. 260—627)

The present invention is related to the treatment of petroleum hydrocarbons with aqueous alkaline solutions. More specifically, it is directed to recovery of phenolic materials which are present in the aqueous solutions used in the treatment of petroleum hydrocarbons. The invention is further directed to a method for the production of phenolic materials of improved quality.

It is well known that certain petroleum hydrocarbon mixtures contain acidic materials, such as phenols and phenolic derivatives, and organic acids, which are objectionable if allowed to remain in the hydrocarbon mixture during its use. Substantial quantities of these acidic materials are frequently present in natural petroleums; however, even greater quantities are produced during certain processing stages of refining such as in thermal cracking of selected fractions of natural petroleum for the manufacture of gasoline, gas oil, and other products. If these acidic materials remain in the product, such as for example the gas oil, they result in corrosion of equipment during the use of the product and also they impart undesirable odors to the product. The customary procedure for removing acidic materials from petroleum hydrocarbons includes treating the hydrocarbon containing these materials with an aqueous alkaline solution, such as for example, sodium hydroxide or potassium hydroxide. The acidic bodies are converted to their corresponding metallic salts, sometimes referred to as soaps, by this treatment and are thus extracted from the petroleum into the aqueous phase.

It has long been known that petroleum phenols could be separated from this alkaline extract for use as starting materials in the manufacture of a number of valuable products such as detergents, wetting agents, and inhibitors of various types. The usual procedure for recovering these phenolic materials has been to neutralize an alkaline liquor derived from the treatment of a petroleum hydrocarbon mixture containing phenols with a mineral acid to such an extent that the phenolic materials are separated as an oil phase which can be recovered. The disadvantages of this process for recovering phenolic materials are that appreciable quantitiies of undesirable oils and sulfur compounds are usually present in the recovered phenols. It is difficult to purify the phenols produced as the impurities usually boil in the same range as the phenols and chemical treatment for their removal is expensive. For some purposes the phenols containing the above mentioned impurities may be utilized; however, for other uses, the presence of these impurities renders the petroleum phenols of inferior quality. For example, in the manufacture of phenol-formaldehyde resins the presence of the oily materials, which are sometimes referred to as inert oils, causes the resulting resin to be tacky and poorly cured. Likewise, the presence of sulfur compounds, which are usually mercaptans, results in a product possessing a disagreeable odor and is therefore undesirable. Phenols derived from petroleum in the manner described above are also used as antioxidants to retard the oxidation reaction which causes gum formation in gasoline exposed to air. In addition, they are employed in the manufacture of fungicides and insecticides, and the substituted derivatives are frequently used in the manufacture of wetting agents and detergents by alkylation with unsaturated compounds. It can be easily recognized that the presence of impurities, such as mercaptans, may be particularly objectionable where the phenolic material is used to manufacture the products mentioned above.

It is the main object of this invention to provide a method for processing an aqueous alkaline solution containing metallic salts of phenolic materials in such a manner as to recover petroleum phenols of improved quality. Other objects will become apparent on reading the specification.

I have now discovered that, by a combination of steps including partial neutralization and extraction with a petroleum solvent, a phenolic product can be produced from the waste alkaline liquor derived from the treatment of petroleum hydrocarbons with aqueous alkaline solution which is substantially free of mercaptans and which has reduced quantities of the undesirable inert oils.

The principal steps in the process of the present invention include neutralizing aqueous alkaline solution containing the desired phenolic materials, and then extracting the solution with a petroleum solvent which has a greater affinity for the undesirable constituents of the mixture than for the desired phenolic product, and finally substantially completely neutralizing the solution.

Briefly, then, the invention comprises diluting an aqueous alkaline solution which has been employed to treat petroleum hydrocarbons containing phenolic material with water, followed by settling to recover an aqueous phase, and discarding an oil phase. The aqueous phase is then treated with mineral acid in an amount sufficient to liberate weakly acidic materials, such as the more weakly acidic phenols, and sulfur compounds, such as mercaptans, but in an amount insufficient to cause phase separation. The partially neutralized mixture is then extracted with a hydrocarbon solvent and the raffinate and extract phases separately recovered. The extract phase is distilled for recovery of the hydrocarbon solvent and a phenolic product containing appreciable quantities of sulfur compounds. The aqueous phase is subjected to treatment with additional mineral acid in an amount sufficient to liberate the more acidic phenolic materials and yet maintain in the alkaline solution the highly acidic aliphatic acids. The latter mixture separates into an aqueous phase and an oil phase, the oil phase being separated and distilled for the removal of water and the recovery of phenolic material of improved quality. The aqueous phase which contains highly acidic materials, such as aliphatic acids, may be discarded or recovered if desired.

The invention will be more clearly understood from the following description which is given in conjunction with the drawing in which the single figure is a schematic flow diagram of one mode of practicing the process of the present invention.

For purposes of description, it will be assumed that a petroleum hydrocarbon boiling in the range of 420° to 620° F. containing phenolic bodies has been extracted with a solution of sodium hydroxide of approximately 35° to 40° Bé. in an amount sufficient to neutralize entirely the acidic materials present in the hydrocarbon mixture. The products of this treatment will be a purified hydrocarbon mixture and an aqueous alkaline solution containing the oil soluble sodium salts of the acidic materials formerly present in the petroleum hydrocarbons. This aqueous alkaline solution constitutes the charge stock for the present process.

Referring now to the drawing, numeral 11 designates a line by which the above mentioned alkaline liquor is charged to settling zone 12. The numeral 13 designates a line by which water may be admitted to line 11 for dilution of the aqueous alkaline liquor prior to its injection into settling zone 12. The alkaline liquor contains a small amount of entrained emulsified oil from the treating stage and the added water facilitates the separation of this oil into a separate upper layer upon standing. The amount of water added by way of line 13 will usually be approximately one volume for each volume of phenolic soaps charged through line 11; however, smaller or larger quantities may be used as required to bring about optimum separation of the oil in settling zone 12. The residence time in settling zone 12 will be sufficient to allow the separation of the oil phase which rises to the top of the vessel and is withdrawn by way of line 14.

The aqueous phase is withdrawn from settling zone 12 by way of line 15 which discharges into a second settling zone 16. A quantity of a mineral acid, such as sulfuric acid, is admitted to line 15 by way of branch line 17 in an amount sufficient to neutralize partially the alkaline liquor in line 15. It will usually be found desirable to employ sulfuric acid having a strength of approximately 30%; however, other concentrations from about 20% to about 80% may be satisfactorily employed. The total quantity of acid employed in this step will usually be in the range of 10% to 50% of the theoretical equivalent for complete neutralization. The partially neutralized material flowing in line 15 has mixed with it a quantity of a petroleum solvent which is admitted by way of branch line 18 and which may be either recycled as described later, or may be added from a source, not shown, by way of line 19. The mixture of partially neutralized aqueous alkaline liquor and petroleum solvent in settling zone 16 separates by gravity into an upper extract phase and a lower aqueous or raffinate phase.

The extract phase is discharged from zone 16 by line 20 to fractionating tower 21 which may contain suitable internal equipment for intimate contact between vapors and liquid and which is equipped with suitable means such as heating coil 22 for supplying heat for distillation. The distillate from fractionating tower 21 which consists primarily of the petroleum solvent mentioned above leaves by way of line 23 and may be returned to line 18 by way of line 24 for recycling in the process by closing valve 25 in line 45 and opening valve 26, or if desired it may be discharged from the system by way of line 45, in which case valve 25 is open and valve 26 is closed. If the solvent is to be recycled, valve 27 in line 19 remains closed except when addition of fresh solvent is required to compensate for losses from the system. In the event it is desired only to employ fresh hydrocarbon solvent, valve 26 is closed and valves 25 and 27 are open. The bottoms from tower 21 consist principally of phenols and are withdrawn through line 47.

The partially neutralized aqueous raffinate phase leaving zone 16 by way of line 28 has added to it by branch line 29 an additional quantity of mineral acid, such as sulfuric acid, sufficient to obtain a pH of approximately 9 in the solution. Under these conditions, the phenolic materials not liberated in the previous neutralization step are liberated and separated as an upper oil phase in zone 30 to which the neutralized raffinate is admitted by line 31. The upper phase which separates in zone 30 comprises a mixture of phenolic materials and is discharged by line 32 which passes to zone 33 where the mixture is heated to a sufficient extent to evaporate all of the water which is carried in the stream. The heated stream flows by way of line 34 into zone 35 which is operated at a sufficiently low pressure for the removal of substantially all of the water present in the stream as vapor which is discharged by way of line 36. Zone 35 is not equipped with means for additional heating; however, it may be equipped with suitable baffles to prevent the entrainment of phenolic material with the water vapor leaving by way of line 36. The dehydrated oil is discharged from zone 35 by way of line 37 to fractionating tower 38 which, similar to fractionating tower 21, is equipped with suitable internal means for securing contact between liquid and vapor and with a means 39, such as a heating coil, for supplying heat for distillation.

It will usually be found desirable to operate tower 38 at reduced pressure and this is accomplished by use of suitable vacuum producing equipment such as steam ejector 40 connected to tower 38 by line 41. Steam from the ejector together with non-condensible gases is discharged to the atmosphere by way of line 42. The distillate from fractionating tower 38 is discharged by way of line 43 and comprises the purified phenolic materials, while the bottoms of fractionating tower 38 is discharged by way of line 44 and comprises a mixture of higher boiling phenolic materials, also containing reduced amounts of sulfur compounds.

The aqueous layer, separated in zone 30, comprises the aliphatic acidic materials and contains substantially no phenolic material. It is discharged from zone 30 by way of line 46 and may be discarded or used as the charging material in other processes for the recovery of its components.

While the previous description is given in conjunction with the treatment of a petroleum hydrocarbon boiling in the range of 420° to 620° F., it is to be understood that hydrocarbon mixtures of any desired boiling range and containing desirable phenolic compounds may be similarly treated. Likewise, it has been mentioned that the amount of sulfuric acid employed in the preliminary partial acidification step is in the range of 10% to 50% of the theoretical equivalent for complete neutralization. Although it will usually be found desirable to operate in this range, the range given is not to be construed as limiting the invention, the quantity being limited only to an amount smaller than that required to cause phase separation prior to the admission of the hydrocarbon solvent. The quantity of hydrocarbon solvent to be employed in the extraction step will usually be 25 to 30 volume per cent, based upon the separated aqueous liquor from settling zone 12; however, larger quantities may be employed, satisfactory results having been obtained with as high as 75% of solvent. The quantity is governed chiefly by the degree of separation obtained and the cost of recovering the solvent for recycling.

The hydrocarbon solvent employed in the practice of this invention may be any petroleum hydrocarbon of suitable boiling range for separation from the phenols by distillation, which is unaffected by treatment with sulfuric acid and which is not reactive with the phenolic materials or other materials present in the solution being treated. Hydrocarbons suitable for this purpose are the paraffinic hydrocarbons such as propane, butane, pentane, hexane, heptane, or octane or mixtures of these. Aromatic solvent may be employed in some cases; however, the paraffinic types will usually be preferred. In the recovery of phenolic materials of the type usually found in gas oils, it will usually be found desirable to use butane, isopentane, or pentane as the hydrocarbon solvent since this material has the desired solubility effect upon the phenolic materials and is easily recovered by simple distillation.

In order to demonstrate the advantages of the method of the present invention, a number of runs were conducted in which purified phenolic material was recovered from a mixture of phenolic soaps by the procedure of partial acidification and extraction in accordance with the invention. In conducting the runs, data from which are shown in the following table, a concentrated aqueous alkaline solution obtained from the treatment of a cracked petroleum hydrocarbon fraction boiling in the gas oil boiling range was diluted with an equal volume of water to facilitate the separation of entrained oil particles. Portions of the diluted phenolic soaps from the remaining aqueous alkaline solution were acidified with 10, 20, 30, 40, 50, 60, and 70 per cent of the theoretical acid requirements for complete neutralization in a first neutralization step. The amount of acid required for total neutralization was first determined by titrating a representative sample of the dilute phenolic soaps with sulfuric acid of approximately 30% $H_2SO_4$ concentration to the phenolphthalein end point. The sulfuric acid used in these preliminary partial neutralization steps was also of approximately 30% concentration. The homogeneous solution resulting from the preliminary acidification was then extracted with 25 volume per cent of isopentane based on the dilute phenolic soaps. The mixture thus formed was agitated to obtain good contact and the hydrocarbon phase allowed to separate by gravity settling.

The hydrocarbon phase, containing phenolic material and some sulfur compounds, was then separated and the aqueous phase was removed and treated with additional quantities of 30 per cent sulfuric acid such that the pH of the neutralized solution was approximately 9.0. Under these conditions, there occurred a separation of phenolic material as an oil phase while the more acidic aliphatic acids remained in the aqueous solution by virtue of the slight residual alkalinity. The mixture was allowed to separate completely and the oil phase was recovered. The recovered oil phase was then distilled under a subatmospheric pressure to 70 per cent distillate, leaving 30 per cent of the material in the residue. Sulfur determinations were then made on the 0 to 70 per cent distillate obtained above by the bomb sulfur method. The analytical procedure for this test is given in the 1946 edition of "A. S. T. M. Standards on Petroleum Products—Committee D–2," pages 426–428. The amount of so-called inert oils was then determined by treating a portion of the 0 to 70 per cent distillate with two volumes of 27° Bé. caustic alkali, extracting the mixture thus obtained with petroleum ether, evaporating the ether from the extract and weighing the remaining oil.

The beneficial aspects of the treating procedure described above are illustrated by the following data which show the sulfur content and the inert oil content of the finished phenolic product, together with the percent of phenols, oils, and sulfur compounds removed by the hydrocarbon solvent extraction when acidifying, in two steps, an aqueous solution of phenolic soaps.

TABLE

*Fractional acidification of phenolic soap*

| | | | | | | | | |
|---|---|---|---|---|---|---|---|---|
| Preliminary acidification, per cent of theoretical acid requirement added | 10 | 20 | 30 | 40 | 50 | 60 | 70 | 98 |
| Per cent of phenols, oil, and sulfur compounds removed with isopentane wash | | | 5 | 6 | 6.5 | 7 | 7 | 7.5 | 12.5 |
| Per cent of theoretical acid requirement added to isopentane-washed soap | 88 | 78 | 68 | 58 | 48 | 38 | 28 | |
| Phenols from Secondary Acidification Distilled to 0–70% overhead phenols: | | | | | | | | |
| Bomb sulfur, per cent by weight | | | 0.52 | 0.32 | 0.24 | 0.11 | 0.18 | 0.23 | 0.44 |
| Inert oil [1], per cent by weight | | | 3.09 | 1.71 | 1.80 | 1.20 | 1.72 | 2.00 | 6.98 |

[1] Determined by extracting material insoluble in 2 volumes of 27° Bé. caustic.

While the data show that a total of 98% of the theoretical acid required for complete neutralization was added in the two neutralization steps, this is an approximate value as the actual amount of acid employed was that amount required to obtain a pH of approximately 9.0 in the solution of the second neutralization step.

It will be observed from the data in the above table that the quantity of sulfur and of inert oil in the finished phenolic material is increased as the quantity of acid used in the preliminary acidification step is increased beyond 50% of the theoretical requirement for total neutralization.

In the present specification and claims, the term "phenolic material" is used with the intent to cover hydroxy-aromatic materials such as phenol, cresol, xylenol, and other similar materials occurring in and derived from petroleum hydrocarbons. By the term "phenolic soaps" is meant the product of reaction between the above mentioned phenolic materials and an alkali metal hydroxide.

The nature and objects of the present invention having been completely described and illustrated, what I wish to claim as new and useful and to secure by Letters Patent is:

1. A process for recovering phenolic materials from an aqueous alkaline liquor containing them which comprises partially neutralizing the alkaline liquor with a quantity of a mineral acid in the range between 10% to 50% of the theoretical acid requirement for complete neutralization of said alkaline liquor to form a first homogenous solution, extracting said first solution by agitating same with a hydrocarbon solvent, settling said agitated solution, to form an extract phase and a raffinate phase, subjecting the raffinate to treatment with an additional amount of a mineral acid to form a second solution having a pH of approximately 9, separating an oil phase from said second solution, and recovering phenolic material from the oil phase.

2. A method in accordance with claim 1 in which the hydrocarbon solvent is a saturated paraffin hydrocarbon.

3. A process for recovering phenolic materials from an aqueous alkaline solution containing them and organic sulfur compounds which comprises adding to the solution, sulfuric acid of a concentration in the range of 20 to 80 per cent $H_2SO_4$ in an amount between 10 and 50 per cent of the theoretical requirement for complete neutralization to form a first partially neutralized solution, extracting said first solution with a paraffin hydrocarbon solvent to form an extract phase and a raffinate phase, separating the phases, distilling the extract phase and recovering separately therefrom a fraction containing phenolic material and organic sulfur compounds, and a paraffin hydrocarbon fraction, adding to the raffinate sulfuric acid of 20 to 80 per cent $H_2SO_4$ concentration to form a second partially neutralized solution having a pH of approximately 9.0, causing said second solution to form an oil phase and an aqueous phase, separating said oil and aqueous phases, distilling the oil phase to remove water and to recover phenolic material containing reduced quantities of organic sulfur compounds, and discarding the aqueous phase.

4. A process for recovering phenolic materials from an aqueous solution of sodium hydroxide containing them and organic sulfur compounds which comprises adding to the solution sulfuric acid of a concentration in the range of 20 to 80 per cent $H_2SO_4$ in an amount between 10% and 50% of the theoretical requirement for complete neutralization to form a first partially neutralized solution, extracting said first solution with 25 to 75 volume per cent of isopentane based on the aqueous alkaline solution to form an extract phase and a raffinate phase, separating the phases, distilling the extract phase to recover separately a fraction containing phenolic material and organic sulfur compounds and an isopentane fraction, subjecting the raffinate to treatment with sufficient sulfuric acid of 20 to 80 per cent $H_2SO_4$ concentration to form a second partially neutralized solution having a pH of approximately 9.0, causing said second solution to form an oil phase and an aqueous phase, separating said oil and aqueous phases, distilling the oil phase to remove water and to recover phenolic material, and discarding the aqueous phase.

ALBERT J. SHMIDL.

REFERENCES CITED

The following references are of record in the file of this patent:

UNITED STATES PATENTS

| Number | Name | Date |
|---|---|---|
| 2,391,128 | Cauley et al. | Dec. 18, 1945 |

FOREIGN PATENTS

| Number | Country | Date |
|---|---|---|
| 386,977 | Great Britain | Jan. 18, 1933 |